United States Patent Office 3,404,095
Patented Oct. 1, 1968

3,404,095
BREAKING FOAMS ON FOAMING
AQUEOUS LIQUIDS
Lyle W. Colburn, Midland, Mich., assignor to The Dow Chemical Company, Midland, Mich., a corporation of Delaware
No Drawing. Continuation-in-part of application Ser. No. 345,067, Feb. 17, 1964. This application May 10, 1967, Ser. No. 637,353
2 Claims. (Cl. 252—321)

ABSTRACT OF THE DISCLOSURE

Reducing foaming of foamable and foaming aqueous liquids while delivering a body of such liquid to another location at a velocity normally causing foaming by passing such a liquid or foaming liquid through a permeable mass having tortuous interconnected pores throughout, which mass is wettable by, and permeable to the aqueous liquid.

---

This application is a continuation-in-part of U.S. Patent application Ser. No. 345,067, filed Feb. 17, 1964, now abandoned.

This invention concerns a method of reducing the extent of foaming of foamable and foaming aqueous liquids while pouring or otherwise delivering a stream or body of such liquid from one location to another, e.g., to a vessel or a body of liquid in a vessel, at a velocity normally causing foaming of the aqueous liquid. The method involves passing such a liquid or foaming liquid through a permeable mass having tortuous interconnected pores throughout which mass is wettable by, and permeable to the aqueous liquid.

It has been found that upon contact of the foaming or foamable liquid with such a porous mass of solid but permeable material, foam bubbles formed are destroyed and the extent of foaming is reduced or foaming is prevented.

It is known that various aqueous liquids, on being transferred, e.g., by feeding or flowing a stream or body thereof to a vessel, foam to such an extent that the transfer cannot be efficiently made. The liquid may be a solution of one or more organic and/or inorganic materials in an aqueous solvent, the major proportion of which is water.

Various costly and involved procedures have been developed to minimize the foaming of aqueous liquids being transferred from one vessel or location to another, but to date none is completely satisfactory.

It has now been discovered that the transfer of a stream of a normally foamable aqueous liquid to a surface, e.g., of a vessel or container can be carried out in such a way that the foam which normally forms is destroyed completely or is substantially reduced approximately as fast as it forms.

The method involves passing the stream of liquid being transferred to a vessel, or to a body of the same or a different liquid contained in the vessel, or to other liquid or solid surfaces, e.g., at a point of use of the liquid, through a permeable mass, e.g., an organic or inorganic porous, foamed or otherwise permeable mass which is wetted by the foamable aqueous liquid whereby the foam is destroyed or substantially reduced as it passes through the tortuous interconnected pores of the permeable mass, e.g., entrained gases or air are separated from such foaming liquid.

Now, if such permeable mass is in contact with or almost in contact with the liquid level in the vessel to which the foamable aqueous liquid is being delivered, then the impingement of the stream of liquid upon a resilient permeable mass will substantially reduce the foam generation in the vessel; whereas, if the liquid level in the vessel is substantially above the permeable mass and the stream of liquid being transferred to the vessel impinges upon and into the foamable aqueous liquid thereby causing excessive foam generation, then the permeable mass which then may be either resilient or non-resilient will cause the entrained gases to be separated from the liquid, thereby destroying the foam as the foaming and foamed liquid passes through the permeable mass.

If the pore diameter, pore volume and thickness of said resilient permeable mass are selected so that the flow rate through said resilient permeable mass is approximately equal to or greater than the flow rate of the stream of foamable aqueous liquid being transferred, e.g., to a vessel, then foam generation will be substantially reduced or eliminated and the effluent liquid from the permeable mass will be substantially or completely defoamed. By contrast, if the effluent flow, e.g., from a vessel is less than the volume of foamable aqueous liquid being transferred to the vessel, then the liquid level in the vessel will rise above the permeable mass and the stream of foamable aqueous liquid will then impinge upon and into said liquid, thereby causing excessive foam generation. Such foamed aqueous liquids can then be defoamed by passing them through either a resilient or a non-resilient permeable mass.

Also, if the readily foamable aqueous liquid is caused to foam by some turbulence other than that caused by the impingement of a stream of said liquid onto or into a non-gaseous body at a velocity sufficient to cause foaming, then the permeable mass for defoaming can be either a resilient permeable mass or a rigid permeable mass.

The porous, foamed or otherwise permeable, resilient mass through which a stream of said foamable liquid is passed or through which an otherwise foamed body of aqueous liquid is passed, i.e., not as a stream, must be readily wetted by said liquid, i.e., must be hydrophilic on its surface. By hydrophilic is meant a material which is wetted by water so that water forms a film rather than beads thereon. Such permeable masses as are useful in the process of this invention have a pore volume, i.e., a percentage of voids, of at least 20% and up to 99+% and an effective pore diameter less than that of the major proportion of the cells of foam generated in or on the aqueous foamable liquid, generally at least about 0.025 mm.

Suitable porous or permeable masses which are operable in the process of this invention are open-celled or porous polymers and sponges having tortuous interconnected pores therethrough, e.g., those resinous polymeric materials which, when foamed with conventional blowing agents, form open-celled structures not soluble in the aqueous foamable or foaming liquid being transferred, i.e., those of a rubber, polymeric urethane, vinyl or cellulosic nature, as well as natural sponges, metal sponges and like structures.

Those resinous polymers which do not form open-celled structures with blowing agents can be prepared in forms suitable for use in practice of the present invention by polymerizing monomers in admixture with dispersed water-soluble salts or other water-soluble compounds which do not react deleteriously therewith. After the resinous polymers containing such dispersed water-soluble materials are formed, the water-soluble materials are leached out with water to give open-celled, permeable structures. These include polystyrene, polyethylene and other olefin polymer types, etc. If a rigid polymer is desired, a crosslinking agent in amount sufficient to give a rigid structure is used.

Other suitable, permeable, resilient materials are steel wool, glass wool, sand when kept in a turbulent state so as to afford a resilient mass and water-swollen anion and cation exchange resin beads in an ionic form which is wettable by and not deleteriously reactive with the liquid being treated, i.e., do not react with a substantial proportion of the foam-promoting solute under conditions of treatment so as to remove the foam-promoting solute from solution, i.e., after treatment, the foam can be regenerated.

It is apparent that by resilient is meant a material which can be deformed by subjecting it to the stress of an impinging stream of an aqueous foamable liquid which is fed at a flow rate sufficient to generate foam, which material either assumes, or can be reformed to, its original state upon removal of the stress. A simple finger pressure test suffices to indicate whether a permeable material is resilient, i.e., yields on pressing and recovers when finger pressure is removed.

All of the many diverse, permeable masses, as above described, which are operable in the practice of this invention are used in a thickness sufficient to reduce substantially or to eliminate the foam arising from a foam-generating stream or body of aqueous liquid approximately as rapidly as it forms. For each such mass, the thickness is dependent upon the permeability or openness of its structure and upon the nature of the foamable liquid being processed. A simple use test suffices to show what thickness should be used with respect to a given permeability of material and with respect to a given formable liquid.

The permeability, i.e., the pore volume and effective pore diameter of a given material, e.g., an open-celled plastic foam or sponge, can be regulated in known ways such as by the nature of the blowing agent used to make it or the concentration of the blowing agent or the temperature at which the composition is blown or by using a solvent, whether chemical or physical, to enlarge the holes or pores of the plastic foam or by mechanical means. By the effective pore diameter of a permeable mass is meant the actual pore diameter of such permeable masses as open-celled plastic foams or sponges, whereas for particulate solid beds, e.g., those of water-swollen ion exchange resin beads or sand kept in a turbulent state, the space between the particles is considered to be the effective pore diameter.

Also, the surface of a normally hydrophobic, permeable, resilient mass can be rendered hydrophilic by known chemical or physical treatment. For example, normally hydrophobic polyurethane foams are rendered hydrophilic by soaking in acetone for about 30 minutes or a dilute ca. 5 percent aqueous sodium hypochlorite, adjusted to a pH of ca. 12–13, for 2–4 hours. Other hydrophobic materials can be rendered hydrophilic by sorption on their surfaces of molecules of a compound having a hydrophobic and a hydrophilic moiety, e.g., soaps, wherein the hydrophilic moiety is oriented away from the hydrophobic surface.

In practice, a surface, e.g., of a collecting vessel or a processing vessel, usually containing a liquid in which a foamed or foaming liquid is flowing or a foamable liquid is to be discharged as a stream is covered with a thickness of a permeable mass, as described above. When a foam-generating stream is being discharged, the permeable mass advantageously is (1) in contact with the surface onto which the treated liquid would otherwise have been discharged or (2) is close thereto if it is desired to prevent the reformation of an undesirable amount of foam. Hereinafter, the expression "close proximity" shall be used to mean either of the two foregoing alternatives. The distance above which the permeable, resilient mass may be positioned with respect to the surface, vessel or body of liquid into which a stream of the treated liquid is to be discharged, will vary with the kind of liquid and with the permeability of the resilient mass. A simple use test will suffice to indicate for a given liquid and a given permeable, resilient mass the degree of proximity which is required in order to avoid reforming of an objectionable amount of foam.

Alternatively, the discharge end of the pipe or other conduit from which the foamable liquid is to be discharged may be covered with or have attached thereto a thickness of a permeable, resilient mass, e.g., polyurethane foam, which mass advantageously is in close proximity to a vessel or a body of the same or a different liquid contained therein, as described above.

Also, in those instances in which turbulence other than that caused by the impingement of an aqueous stream gives rise to foaming, the foam can be minimized or destroyed by passing the foaming aqueous liquid through a resilient or non-resilient permeable mass, as characterized above and having a thickness sufficient to minimize or destroy the foam as rapidly as the foam is formed. This is advantageously accomplished by placing said permeable mass in a location where the foamed aqueous liquid will pass through it, i.e., at some point where the defoamed aqueous liquid will become quiescent or slowed down to a velocity where the foam will not immediately be regenerated by a renewal of foam-forming turbulence.

In rare instances, the concentration of one or more solutes may be so high that the foam of the foaming liquid does not readily collapse or collapses too slowly. If such is the case, water is added until a lower concentration is obtained, as determined by a test or a series of simple tests, wherein the foam which then forms is readily collapsed by the permeable mass.

Among the foamable aqueous solutions which can be transferred by the process of this invention so that foaming will no longer be a problem are those containing natural and synthetic surfactants, detergents, wetting agents, alkyl and hydroxyalkyl cellulose ethers, carbohydrates, proteins, etc.

The following examples describe completely representative specific embodiments and the best modes contemplated by the inventor of carrying out the invention. They are not to be taken as limiting the invention other than as defined in the claims.

Example 1

The bottom of an open-topped, wooden box is removed and a metal screen having openings about one-quarter inch square is nailed on in its place. Over the metal screen inside the box structure is placed a sheet of hydrophilic-surfaced, flexible, resilient polyurethane foam 12 inches square by 4 inches thick having open cells ca. 0.5 mm. in diameter and a pore volume of ca. 99+ percent. The resulting open-topped structure is positioned over a vessel containing aqueous 2 percent 400 centipoise methylcellulose, a solution which normally foams copiously when fed as an unconfined stream into a vessel. A ca. 1-inch inside diameter pipe feeding more of the same solution heated to a temperature of 70° C. at a flow rate sufficient to generate copious foaming is discharged 3 inches or more above the surface of the polyurethane foam. The bottom of the sheet of polyurethane foam is in contact with the methylcellulose solution contained in the vessel. As the discharged methylcellulose solution hits the surface of the polyurethane foam, it begins to foam copiously, but the foam collapses and disappears completely, substantially as rapidly as it forms, and clear methylcellulose solution passes from the bottom surface of the polyurethane foam into the solution contained in the vessel. As the vessel fills with methylcellulose solution, it is foam free. The bottom of the polyurethane foam can be raised ca. 3 inches from the surface of the methylcellulose solution by raising the box-like structure before an objectionable amount of foam reforms.

Example 2

The procedure of Example 1 is repeated with an aqueous 0.3 percent solution of sodium dodecylbenzene sulfonate. The copious foam which is apparent where the solution hits the surface of the polyurethane foam rapidly disappears, giving a foam-free effluent.

Example 3

Fine grade steel wool 2 inches thick, when substituted for the sheet of polyurethane foam of Examples 1 and 2, works almost as rapidly in destroying foam.

Example 4

Fine glass wool about 2 inches thick, when substituted for the sheet of polyurethane foam of Examples 1 and 2, works somewhat less rapidly in destroying foam.

Example 5

Water-swollen Dowex 50–X8, 20–50 mesh, polymeric styrene sulfonate cation exchange resin in the sodium form (having a pore volume of about 33 percent and an effective pore diameter of ca. 25–70 microns) in a bed 3 inches thick is also effective in destroying foam when substituted for the sheet of polyurethane foam of Examples 1 and 2. To avoid undesirable reaction with solution being treated, the water-swollen cation exchange resin beads should be used in an ionic form which is substantially non-reactive therewith under conditions of use, i.e., should not remove any appreciable amount of foam-forming solute.

Example 6

Water-swollen Dowex 1–X8, 20–50 mesh, polyvinylbenzyl trimethylammonium chloride anion exchange resin (having a pore volume of about 33 percent and an effective pore diameter of ca. 25–70 microns) in a bed 3 inches thick gives excellent results when substituted for the sheet of polyurethane foam of Examples 1 and 2.

Example 7

A bed of fine sand having a settled depth of 3 inches retained on a fine mesh screen, when kept in a state of turbulence by discharging solutions so as to give a resilient mass also achieves effective foam destruction when substituted for the sheet of polyurethane foam of Examples 1 and 2.

Example 8

A slowly moving large body of treated sewage following the conventional aeration step and on which a head of foam is floating is passed through weighted down and partially submerged 4-inch thick staggered pieces of hydrophilic-surfaced rigid polyurethane foam having open cells ca. 0.5 mm. in diameter and a pore volume of ca. 98 percent. The effluent side of the foamed treated sewage is then foam free. When a 0.25 mm. pore diameter polyurethane foam, otherwise similar to the foam characterized above, is substituted for the latter, a somewhat longer time is required for the floating head of foam to be collapsed.

The procedures outlined above are equally effective in destroying or minimizing foam which results when a stream or body of a foaming or readily foamable aqueous liquid is delivered into a body of another liquid.

I claim:

1. In a process wherein a readily foamable aqueous cellulose ether solution is fed as a stream into a vessel at a flow rate sufficient to generate foam, the improvement which consists in reducing said development of foam to less than the volume of foam produced under otherwise similar conditions by directing said stream of foamable aqueous cellulose ether solution into contact with and through a polyurethane foam the surface of which has been rendered hydrophilic, said foam being wettable by and resilient and permeable to said aqueous solution but not deleteriously reactive therewith, having a thickness sufficient to reduce foam, and containing tortuous interconnected pores throughout with a pore volume of at least 20% and an effective pore diameter less than that of the major proportion of the cells of foam to be reduced, whereby said generated foam is reduced.

2. The process of claim 1 wherein the aqueous cellulose ether solution is an aqueous solution of methylcellulose.

References Cited

UNITED STATES PATENTS 2,993,867   7/1961   Wilson _____ 252—321

OTHER REFERENCES

Stevens: A Simple Foam Breaker, article in The Paper Industry and Paper World, July 1944, pp. 462 and 463. [Copy in Sci. Lib.] 252–361.

LEON D. ROSDOL, *Primary Examiner.*

RICHARD D. LOVERING, *Examiner.*